US012148434B2

(12) United States Patent
Bruhn

(10) Patent No.: US 12,148,434 B2
(45) Date of Patent: *Nov. 19, 2024

(54) AUDIO FRAME LOSS CONCEALMENT

(71) Applicant: Telefonaktiebolaget LM Ericsson (publ), Stockholm (SE)

(72) Inventor: Stefan Bruhn, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/948,603

(22) Filed: Sep. 20, 2022

(65) Prior Publication Data

US 2023/0008547 A1 Jan. 12, 2023

Related U.S. Application Data

(63) Continuation of application No. 16/414,020, filed on May 16, 2019, now Pat. No. 11,482,232, which is a (Continued)

(51) Int. Cl.

*G10L 19/005* (2013.01)
*G10L 19/02* (2013.01)
*G10L 25/69* (2013.01)

(52) U.S. Cl.

CPC ............ *G10L 19/005* (2013.01); *G10L 19/02* (2013.01); *G10L 25/69* (2013.01)

(58) Field of Classification Search

None

See application file for complete search history.

(56) References Cited

U.S. PATENT DOCUMENTS 4,590,009 A 5/1986 Pampouchidis et al.
5,890,108 A * 3/1999 Yeldener ................ G10L 19/18 704/223

(Continued)

FOREIGN PATENT DOCUMENTS

CN 101261833 9/2008
CN 101366079 2/2009

(Continued)

OTHER PUBLICATIONS

KamilK.Wojcicki;KuldipK.Paliwal;ImportanceoftheDynamicRange ofanAnalysisWindowfunctionforPhase-Onlyand Magnitude-OnlyReconstructionofSpeechPublisher: IEEE; URL:https://ieeexplore.ieee.org/document/4218204 (Year: 2007).*

(Continued)

*Primary Examiner* — Richa Sonifrank
(74) *Attorney, Agent, or Firm* — Sage Patent Group

(57) ABSTRACT

Concealing a lost audio frame of a received audio signal is provided by performing a sinusoidal analysis of a part of a previously received or reconstructed audio signal, wherein the sinusoidal analysis involves identifying frequencies of sinusoidal components of the audio signal, applying a sinusoidal model on a segment of the previously received or reconstructed audio signal, wherein said segment is used as a prototype frame in order to create a substitution frame for a lost audio frame, and creating the substitution frame for the lost audio frame by time-evolving sinusoidal components of the prototype frame, up to the time instance of the lost audio frame, in response to the corresponding identified frequencies.

20 Claims, 8 Drawing Sheets

Related U.S. Application Data continuation of application No. 15/809,493, filed on Nov. 10, 2017, now Pat. No. 10,339,939, which is a continuation of application No. 14/764,318, filed as application No. PCT/SE2014/050067 on Jan. 22, 2014, now Pat. No. 9,847,086.

(60) Provisional application No. 61/760,814, filed on Feb. 5, 2013.

(56) References Cited

U.S. PATENT DOCUMENTS

| | | | | |
|---|---|---|---|---|
| 5,970,440 | A | 10/1999 | Veldhuis | |
| 6,691,092 | B1 | 2/2004 | Bhaskar | |
| 6,996,523 | B1 * | 2/2006 | Bhaskar | G10L 19/097 704/219 |
| 7,003,448 | B1 | 2/2006 | Lauber et al. | |
| 7,272,556 | B1 | 9/2007 | Aguilar et al. | |
| 7,388,853 | B2 | 6/2008 | Ptasinski | |
| 7,822,005 | B2 | 10/2010 | Ptasinski | |
| 8,538,038 | B1 | 9/2013 | Lester | |
| 8,577,482 | B2 * | 11/2013 | Herre | H04S 5/005 381/303 |
| 9,293,144 | B2 | 3/2016 | Bruhn et al. | |
| 2002/0034265 | A1 | 3/2002 | Legrand | |
| 2002/0041570 | A1 | 4/2002 | Ptasinski | |
| 2002/0072901 | A1 | 6/2002 | Bruhn | |
| 2004/0002856 | A1 | 1/2004 | Bhaskar | |
| 2004/0122680 | A1 | 6/2004 | McGowan et al. | |
| 2005/0055204 | A1 | 3/2005 | Florencio | |
| 2005/0058145 | A1 | 3/2005 | Floriencio et al. | |
| 2005/0091041 | A1 * | 4/2005 | Ramo | G10L 19/24 704/E19.044 |
| 2007/0124136 | A1 | 5/2007 | Den Brinker | |
| 2007/0147518 | A1 | 6/2007 | Bessette | |
| 2007/0225971 | A1 | 9/2007 | Bessette | |
| 2007/0282603 | A1 | 12/2007 | Bessette | |
| 2008/0236506 | A1 | 10/2008 | Conger | |
| 2008/0275695 | A1 | 11/2008 | Ramo | |
| 2010/0057467 | A1 | 3/2010 | Wouters | |
| 2010/0318349 | A1 | 12/2010 | Kovesi et al. | |
| 2015/0051452 | A1 * | 2/2015 | Ciaccio | G06F 17/14 600/407 |

FOREIGN PATENT DOCUMENTS

| | | | |
|---|---|---|---|
| EP | 1722359 | A1 | 11/2006 |
| EP | 2375782 | | 10/2011 |
| JP | 2012145895 | | 8/2012 |
| KR | 10-2005-0091034 | A | 9/2005 |
| KR | 10-2009-0082415 | A | 7/2009 |
| WO | WO 2004/059894 | A2 | 7/2004 |
| WO | WO 2006/079348 | A1 | 8/2006 |

OTHER PUBLICATIONS

HuanHou;WeibeiDou;Real-timeaudioerrorconcealmentmethodbasedonsinusoidalmodel Publisher: IEEE;Jul. 2008 URL:https://ieeexplore.IEEE.org/abstract/document/4590009 (Year: 2008).*

P. Mowlaee Begzade Mahale, A. Sayadian; Model-based Monaural Sound Separation by Split-VQ of Sinusoidal Parameters; URL: https://ieeexplore.ieee.org/stamp/stamp.jsp?tp=&arnumber=7080225 (Year: 2008).*

Korean Notice of Preliminary Rejection, Application No. 10-2015-7022751, Oct. 8, 2015.

International Search Report, Application No. PCT/SE2014/050067, Jun. 18, 2014.

Written Opinion of the International Searching Authority, Application No. PCT/SE2014/050067, Jun. 18, 2014.

Written Opinion of the International Preliminary Examining Authority, Application No. PCT/SE2014/050067, Feb. 13, 2015.

International Preliminary Report on Patentability, Application No. PCT/SE2014/050067, Feb. 6, 2015.

Bartkowiak et al., "Mitigation of Long Gaps in Music Using Hybrid Sinusoidal + Noise Model with Context Adaptation", ICSES 2010—The International Conference on Signals and Electronic Systems, Gliwice, Poland, Sep. 7-10, 2010, pp. 435-438.

Hou et al., "Real-time Audio Error Concealment Method Based on Sinusoidal Model", ICALIP 2008—International Conference on Audio, Language and Image Processing, Piscataway, NJ, Jul. 7, 2008, pp. 22-28.

McAulay et al., "Speech Analysis/Synthesis Based on Sinusoidal Representation", IEEE Transactions on Acoustics, Speech, and Signal Processing, vol. ASSP-34, No. 4, Aug. 1986, pp. 744-754.

Serra et al., "Spectral Modeling Synthesis: a Sound Analysis/Synthesis System Based on a Deterministic plus Stochastic Decomposition", Comi:2uter Music Journal, vol. 14, No. 4, Winter Jan. 1990, DD. 12-24.

Smith et al., "Parshl: An Analysis/Synthesis Program for Non-Harmonic Sounds Based on Sinusoidal Representation", Proceedings of the 1987 International Comi:2uter Music Conference, University of Illinois at Urbana-Champaign, Aug. 23-26, 1987, pp. 290-297.

Decision to Grant a European patent pursuant to Article 97(1) EPC, EPO Application No. 14704704.7, Jun. 30, 2016.

Notice of Allowance with English translation of the Granted Claims, Japanese Patent Application No. 2015-555963, Jul. 15, 2016.

Communication with European Search Report, EPO Application No. 16178186.9, Sep. 19, 2016.

Parikh et al., "Frame Erasure Concealment Using Sinusoidal Analysis-Synthesis and Its Application to MDCT-Based Codecs", 2000 IEEE International Conference on Acoustics, Speech and Signal Processing (ICASSP) Proceedings, Jun. 5, 2000, pp. 905-908.

International Search Report, PCT Application No. PCT/SE2014/050068, Jun. 18, 2014.

Written Opinion of the International Searching Authority, PCT Application No. PCT/SE2014/050068, Jun. 18, 2014.

Lemyre et al., "New Approach to Voiced Onset Detection in Speech Signal and Its Application for Frame Error Concealment", IEEE International Conference on Acoustics, S12eech and Signal Processing, 2008. ICASSP 2008, Las Vegas, NV, Mar. 31-Apr. 4, 2008, DD. 4757-4760.

Lindblom et al., "Packet Loss Concealment Based on Sinusoidal Extrapolation", 2002 IEEE International Conference on Acoustics, S12eech, and Signal Processing {ICASSP), Orlando, Florida, May 13-17, 2002, pp. 1-173-1-176.

Quatieri et al., "Audio Signal Processing Based on Sinusoidal Analysis/Synthesis", In: A1212lications of Digital Signal Processing to Audio and Acoustics, Mark Kahrs et al., ed., Dec. 31, 2002, p. 371.

Ricard, "An Implementation of Multi-Band Onset Detection", Proceedings of the 1st Annual Music Information Retrieval Evaluation eXchange {MIREX), Sep. 15, 2005, retrieved from the Internet: URL:htt12://www.music-ir.org/evaluation/mirex-results/articles/onset/ricard.odf, 4 DD.

Wang et al., "An Efficient Transient Audio Coding Algorithm based on DCT and Matching Pursuit", 2010 3rd International Congress on Image and Signal Processing {CISP 2010), Yantai, China, Oct. 16-18, 2010, pp. 3082-3085.

International Preliminary Report on Patentability, PCT Application No. PCT/SE2014/050068, May 22, 2015.

Notice of Preliminary Rejection, Korean Application No. 10-2015-7024184, Oct. 8, 2015.

Korean Notification of Final Rejection Corresponding to Korean Patent Application No. 2015-7022751; Dated: Mar. 14, 2016; Foreign Text, 4 Pages.

Japanese First Office Action Corresponding to Japanese Patent Application No. 2015-555963; Mailing Date: Mar. 4, 2016; Foreign Text, 2 Pages, English Translation Thereof, 2 Pages.

Korean Notification of Final Rejection Corresponding to Korean Patent Application No. 2015-7022751; Dated: May 9, 2016; Foreign Text, 3 Pages.

New Zealand Notice of Acceptance Corresponding to New Zealand Patent Application No. 709639; Dated: Jun. 9, 2016; 1 Page.

(56) References Cited

OTHER PUBLICATIONS

Brazilian Search Report for Brazilian Application No. BR112015017222-9, dated Sep. 3, 2019, 5 pages.
First Office Action for Chinese Patent Application No. 201810571350.1, mailed Jun. 14, 2022, 6 pages.

* cited by examiner

AUDIO FRAME LOSS CONCEALMENT

CROSS REFERENCE TO RELATED APPLICATIONS

This application is a continuation of U.S. patent application Ser. No. 16/414,020, filed on May 16, 2019, which claims the benefit of priority as a continuation of U.S. application Ser. No. 15/809,493, filed Nov. 10, 2017, which is a continuation of U.S. application Ser. No. 14/764,318, filed Jul. 29, 2015, which is a 35 U.S.C. § 371 national stage application of PCT International Application No. PCT/SE2014/050067, filed on Jan. 22, 2014, which itself claims priority to U.S. provisional Application No. 61/760,814, filed Feb. 5, 2013. The disclosures and contents of all of the above referenced applications are incorporated by reference herein in their entireties. The above-referenced PCT International Application was published in the English language as International Publication No. WO 2014/123470 A1 on 14 Aug. 2014.

TECHNICAL FIELD

The invention relates generally to a method of concealing a lost audio frame of a received audio signal. The invention also relates to a decoder configured to conceal a lost audio frame of a received coded audio signal. The invention further relates to a receiver comprising a decoder, and to a computer program and a computer program product.

BACKGROUND

A conventional audio communication system transmits speech and audio signals in frames, meaning that the sending side first arranges the audio signal in short segments, i.e. audio signal frames, of e.g. 20-40 ms, which subsequently are encoded and transmitted as a logical unit in e.g. a transmission packet. A decoder at the receiving side decodes each of these units and reconstructs the corresponding audio signal frames, which in turn are finally output as a continuous sequence of reconstructed audio signal samples.

Prior to the encoding, an analog to digital (A/D) conversion may convert the analog speech or audio signal from a microphone into a sequence of digital audio signal samples. Conversely, at the receiving end, a final D/A conversion step typically converts the sequence of reconstructed digital audio signal samples into a time-continuous analog signal for loudspeaker playback.

However, a conventional transmission system for speech and audio signals may suffer from transmission errors, which could lead to a situation in which one or several of the transmitted frames are not available at the receiving side for reconstruction. In that case, the decoder has to generate a substitution signal for each unavailable frame. This may be performed by a so-called audio frame loss concealment unit in the decoder at the receiving side. The purpose of the frame loss concealment is to make the frame loss as inaudible as possible, and hence to mitigate the impact of the frame loss on the reconstructed signal quality.

Conventional frame loss concealment methods may depend on the structure or the architecture of the codec, e.g. by repeating previously received codec parameters. Such parameter repetition techniques are clearly dependent on the specific parameters of the used codec, and may not be easily applicable to other codecs with a different structure. Current frame loss concealment methods may e.g. freeze and extrapolate parameters of a previously received frame in order to generate a substitution frame for the lost frame. The standardized linear predictive codecs AMR and AMR-WB are parametric speech codecs which freeze the earlier received parameters or use some extrapolation thereof for the decoding. In essence, the principle is to have a given model for coding/decoding and to apply the same model with frozen or extrapolated parameters.

Many audio codecs apply a coding frequency domain-technique, which involves applying a coding model on a spectral parameter after a frequency domain transform. The decoder reconstructs the signal spectrum from the received parameters and transforms the spectrum back to a time signal. Typically, the time signal is reconstructed frame by frame, and the frames are combined by overlap-add techniques and potential further processing to form the final reconstructed signal. The corresponding audio frame loss concealment applies the same, or at least a similar, decoding model for lost frames, wherein the frequency domain parameters from a previously received frame are frozen or suitably extrapolated and then used in the frequency-to-time domain conversion.

However, conventional audio frame loss concealment methods may suffer from quality impairments, e.g. since the parameter freezing and extrapolation technique and re-application of the same decoder model for lost frames may not always guarantee a smooth and faithful signal evolution from the previously decoded signal frames to the lost frame. This may lead to audible signal discontinuities with a corresponding quality impact. Thus, audio frame loss concealment with reduced quality impairment is desirable and needed.

SUMMARY

The object of embodiments of the present invention is to address at least some of the problems outlined above, and this object and others are achieved by the method and the arrangements according to the appended independent claims, and by the embodiments according to the dependent claims.

According to one aspect, embodiments provide a method for concealing a lost audio frame, the method comprising a sinusoidal analysis of a part of a previously received or reconstructed audio signal, wherein the sinusoidal analysis involves identifying frequencies of sinusoidal components of the audio signal. Further, a sinusoidal model is applied on a segment of the previously received or reconstructed audio signal, wherein said segment is used as a prototype frame in order to create a substitution frame for a lost audio frame. The creation of the substitution frame involves time-evolution of sinusoidal components of the prototype frame, up to the time instance of the lost audio frame, in response to the corresponding identified frequencies.

According to a second aspect, embodiments provide a decoder configured to conceal a lost audio frame of a received audio signal, the decoder comprising a processor and memory, the memory containing instructions executable by the processor, whereby the decoder is configured to perform a sinusoidal analysis of a part of a previously received or reconstructed audio signal, wherein the sinusoidal analysis involves identifying frequencies of sinusoidal components of the audio signal. The decoder is configured to apply a sinusoidal model on a segment of the previously received or reconstructed audio signal, wherein said segment is used as a prototype frame in order to create a substitution frame for a lost audio frame, and to create the substitution frame by time evolving sinusoidal components of the prototype frame, up to the time instance of the lost audio frame, in response to the corresponding identified frequencies.

According to a third aspect, embodiments provide a decoder configured to conceal a lost audio frame of a received audio signal, the decoder comprising an input unit configured to receive an encoded audio signal, and a frame loss concealment unit. The frame loss concealment unit comprises means for performing a sinusoidal analysis of a part of a previously received or reconstructed audio signal, wherein the sinusoidal analysis involves identifying frequencies of sinusoidal components of the audio signal. The frame loss concealment unit also comprises means for applying a sinusoidal model on a segment of the previously received or reconstructed audio signal, wherein said segment is used as a prototype frame in order to create a substitution frame for a lost audio frame. The frame loss concealment unit further comprises means for creating the substitution frame for the lost audio frame by time-evolving sinusoidal components of the prototype frame, up to the time instance of the lost audio frame, in response to the corresponding identified frequencies.

The decoder may be implemented in a device, such as e.g. a mobile phone.

According to a fourth aspect, embodiments provide a receiver comprising a decoder according to any of the second and the third aspects described above.

According to a fifth aspect, embodiments provide a computer program being defined for concealing a lost audio frame, wherein the computer program comprises instructions which when run by a processor causes the processor to conceal a lost audio frame, in agreement with the first aspect described above.

According to a sixth aspect, embodiments provide a computer program product comprising a computer readable medium storing a computer program according to the above-described fifth aspect.

The advantages of the embodiments described herein are to provide a frame loss concealment method allowing mitigating the audible impact of frame loss in the transmission of audio signals, e.g. of coded speech. A general advantage is to provide a smooth and faithful evolution of the reconstructed signal for a lost frame, wherein the audible impact of frame losses is greatly reduced in comparison to conventional techniques.

Further features and advantages of the teachings in the embodiments of the present application will become clear upon reading the following description and the accompanying drawings.

BRIEF DESCRIPTION OF THE DRAWINGS

The embodiments will be described in more detail and with reference to the accompanying drawings, in which.

DETAILED DESCRIPTION

Figure 1:
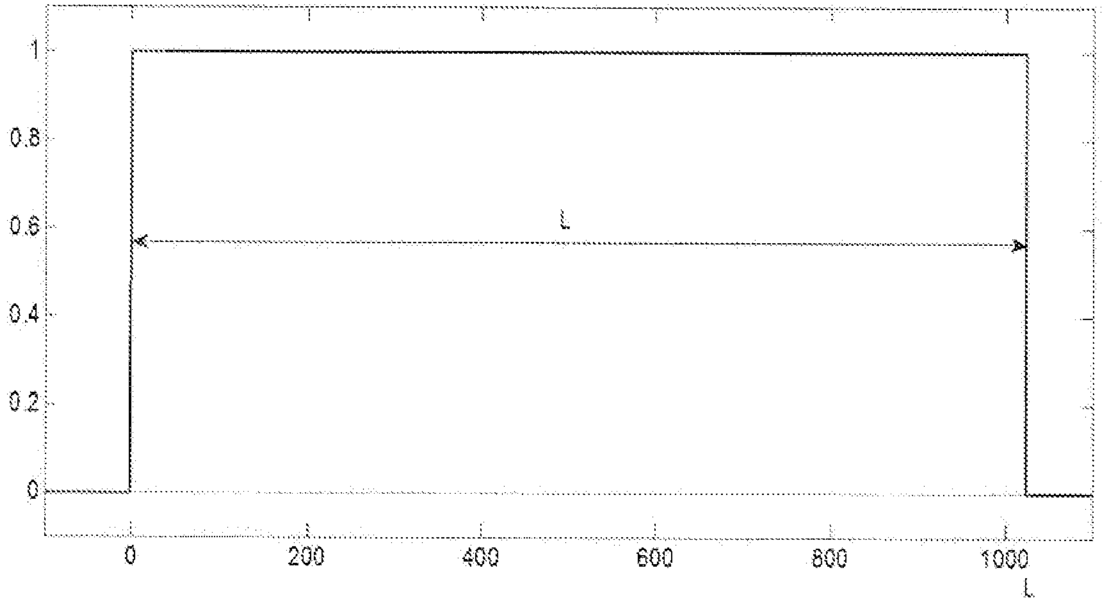
FIG. 1 illustrates a typical window function.

In the following, embodiments of the invention will be described in more detail. For the purpose of explanation and not limitation, specific details are disclosed, such as particular scenarios and techniques, in order to provide a thorough understanding.

Moreover, it is apparent that the exemplary method and devices described below may be implemented, at least partly, by the use of software functioning in conjunction with a programmed microprocessor or general purpose computer, and/or using an application specific integrated circuit (ASIC). Further, the embodiments may also, at least partly, be implemented as a computer program product or in a system comprising a computer processor and a memory coupled to the processor, wherein the memory is encoded with one or more programs that may perform the functions disclosed herein.

A concept of the embodiments described hereinafter comprises a concealment of a lost audio frame by:

- Performing a sinusoidal analysis of at least part of a previously received or reconstructed audio signal, wherein the sinusoidal analysis involves identifying frequencies of sinusoidal components of the audio signal;
- applying a sinusoidal model on a segment of the previously received or reconstructed audio signal, wherein said segment is used as a prototype frame in order to create a substitution frame for a lost frame, and
- creating the substitution frame involving time-evolution of sinusoidal components of the prototype frame, up to the time instance of the lost audio frame, in response to the corresponding identified frequencies.

Sinusoidal Analysis

The frame loss concealment according to embodiments involves a sinusoidal analysis of a part of a previously received or reconstructed audio signal. The purpose of this sinusoidal analysis is to find the frequencies of the main sinusoidal components, i.e. sinusoids, of that signal. Hereby, the underlying assumption is that the audio signal was generated by a sinusoidal model and that it is composed of a limited number of individual sinusoids, i.e. that it is a multi-sine signal of the following type:

$$s(n) = \sum_{k=1}^{K} a_k \cdot \cos\left(2\pi \frac{f_k}{f_s} \cdot n + \varphi_k\right). \tag{6.1}$$

In this equation K is the number of sinusoids that the signal is assumed to consist of. For each of the sinusoids with index k=1 . . . K, $a_k$ is the amplitude, $f_k$ is the frequency, and $\varphi_k$ is the phase. The sampling frequency is denominated by $f_s$ and the time index of the time discrete signal samples s(n) by n.

It is important to find as exact frequencies of the sinusoids as possible. While an ideal sinusoidal signal would have a line spectrum with line frequencies $f_k$, finding their true values would in principle require infinite measurement time. Hence, it is in practice difficult to find these frequencies, since they can only be estimated based on a short measurement period, which corresponds to the signal segment used for the sinusoidal analysis according to embodiments described herein; this signal segment is hereinafter referred to as an analysis frame. Another difficulty is that the signal may in practice be time-variant, meaning that the parameters of the above equation vary over time. Hence, on the one hand it is desirable to use a long analysis frame making the measurement more accurate; on the other hand a short measurement period would be needed in order to better cope with possible signal variations. A good trade-off is to use an analysis frame length in the order of e.g. 20-40 ms.

According to a preferred embodiment, the frequencies of the sinusoids $f_k$ are identified by a frequency domain analysis of the analysis frame. To this end, the analysis frame is transformed into the frequency domain, e.g. by means of DFT (Discrete Fourier Transform) or DCT (Discrete Cosine Transform), or a similar frequency domain transform. In case a DFT of the analysis frame is used, the spectrum is given by:

$$X(m) = DFT(w(n)\cdot x(n)) = \sum_{n=0}^{L-1} e^{-j\frac{2\pi}{L}mn}\cdot w(n)\cdot x(n). \tag{6.2}$$

In this equation, w(n) denotes the window function with which the analysis frame of length L is extracted and weighted.

FIG. 1 illustrates a typical window function, i.e. a rectangular window which is equal to 1 for n∈[0 . . . L−1] and otherwise 0. It is assumed that the time indexes of the previously received audio signal are set such that the prototype frame is referenced by the time indexes n=0 . . . L−1. Other window functions that may be more suitable for spectral analysis are e.g. Hamming, Hanning, Kaiser or Blackman.

Figure 2:
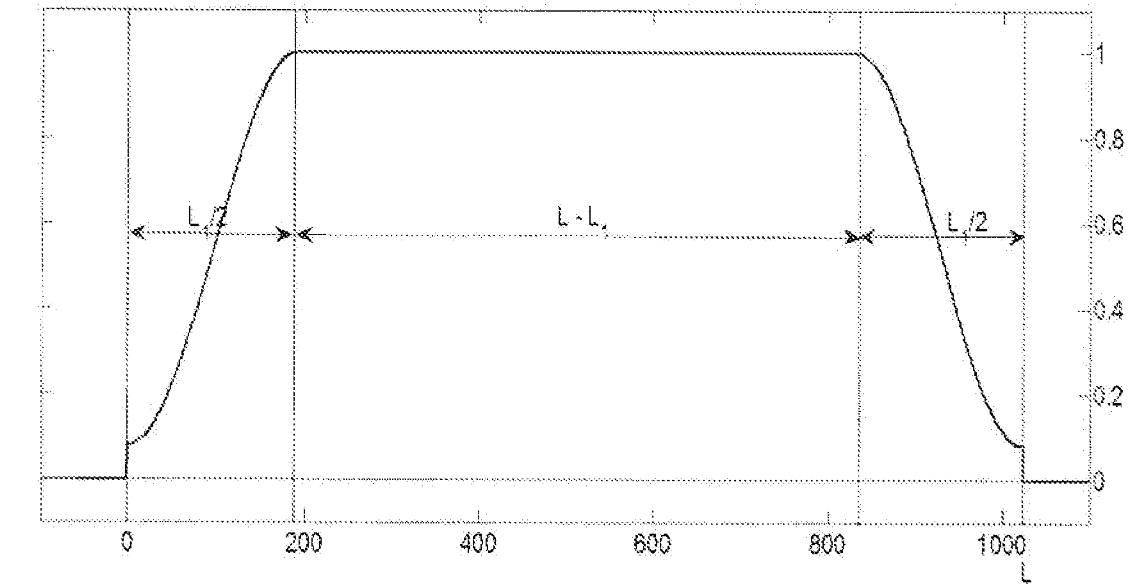
FIG. 2 illustrates a specific window function.

FIG. 2 illustrates a more useful window function, which is a combination of the Hamming window and the rectangular window. The window illustrated in FIG. 2 has a rising edge shape like the left half of a Hamming window of length L1 and a falling edge shape like the right half of a Hamming window of length L1 and between the rising and falling edges the window is equal to 1 for the length of L−L1.

The peaks of the magnitude spectrum of the windowed analysis frame |X(m)| constitute an approximation of the required sinusoidal frequencies $f_k$. The accuracy of this approximation is however limited by the frequency spacing of the DFT. With the DFT with block length L the accuracy is limited to $$\frac{f_s}{2L}.$$

However, this level of accuracy may be too low in the scope of the method according the embodiments described herein, and an improved accuracy can be obtained based on the results of the following consideration:

The spectrum of the windowed analysis frame is given by the convolution of the spectrum of the window function with the line spectrum of a sinusoidal model signal S(Ω), subsequently sampled at the grid points of the DFT:

$$X(m) = \int_{2\pi}\delta\left(\Omega - m\cdot\frac{2\pi}{L}\right)\cdot(W(\Omega)*S(\Omega))\cdot d\Omega. \tag{6.3}$$

By using the spectrum expression of the sinusoidal model signal, this can be written as $$X(m) = \frac{1}{2}\int_{2\pi}\delta\left(\Omega - m\cdot\frac{2\pi}{L}\right)\cdot \sum_{k=1}^{K} a_k\cdot\left(\left(W\left(\Omega + 2\pi\frac{f_k}{f_s}\right)\cdot e^{-j\varphi_k} + W\left(\Omega - 2\pi\frac{f_k}{f_s}\right)\cdot e^{j\varphi_k}\right)\cdot d\Omega\right. \tag{6.4}$$

Hence, the sampled spectrum is given by $$X(m) = \frac{1}{2}\sum_{k=1}^{K} a_k\cdot\left(\left(W\left(2\pi\left(\frac{m}{L}+\frac{f_k}{f_s}\right)\right)\cdot e^{-j\varphi_k} + W\left(2\pi\left(\frac{m}{L}-\frac{f_k}{f_s}\right)\right)\cdot e^{j\varphi_k}\right)\right), \tag{6.5}$$

with m=0 . . . L−1.

Based on this, the observed peaks in the magnitude spectrum of the analysis frame stem from a windowed sinusoidal signal with K sinusoids, where the true sinusoid frequencies are found in the vicinity of the peaks. Thus, the identifying of frequencies of sinusoidal components may further involve identifying frequencies in the vicinity of the peaks of the spectrum related to the used frequency domain transform.

If $m_k$ is assumed to be a DFT index (grid point) of the observed $k^{th}$ peak, then the corresponding frequency is $$\hat{f}_k = \frac{m_k}{L}\cdot f_s$$

which can be regarded an approximation of the true sinusoidal frequency $f_k$. The true sinusoid frequency $f_k$ can be assumed to lie within the interval $$\left[(m_k - 1/2)\cdot\frac{f_s}{L},\ (m_k + 1/2)\cdot\frac{f_s}{L}\right].$$

Figure 4:
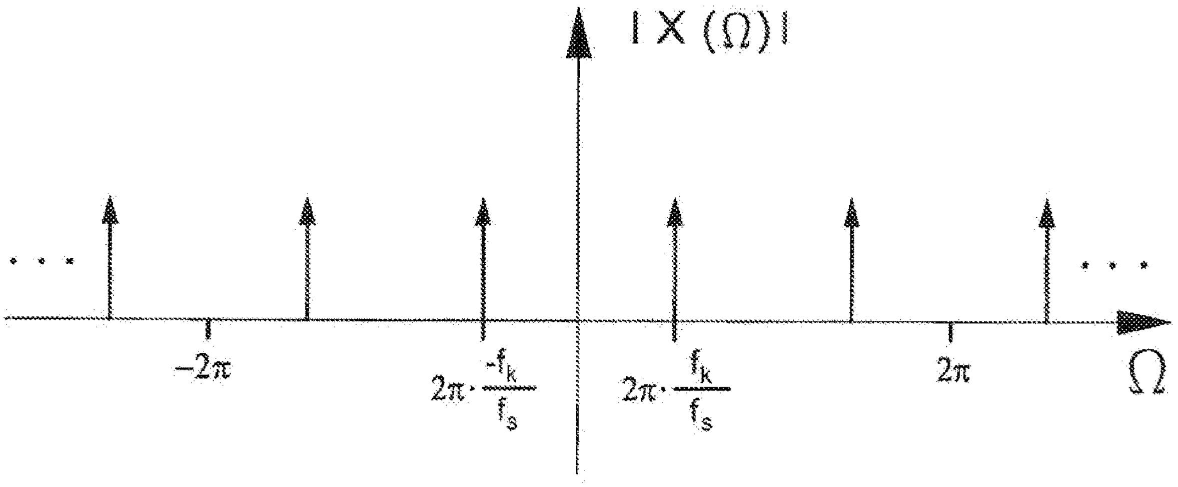
FIG. 4 illustrates a line spectrum of an exemplary sinusoidal signal with the frequency $f_k$.
Figure 5:
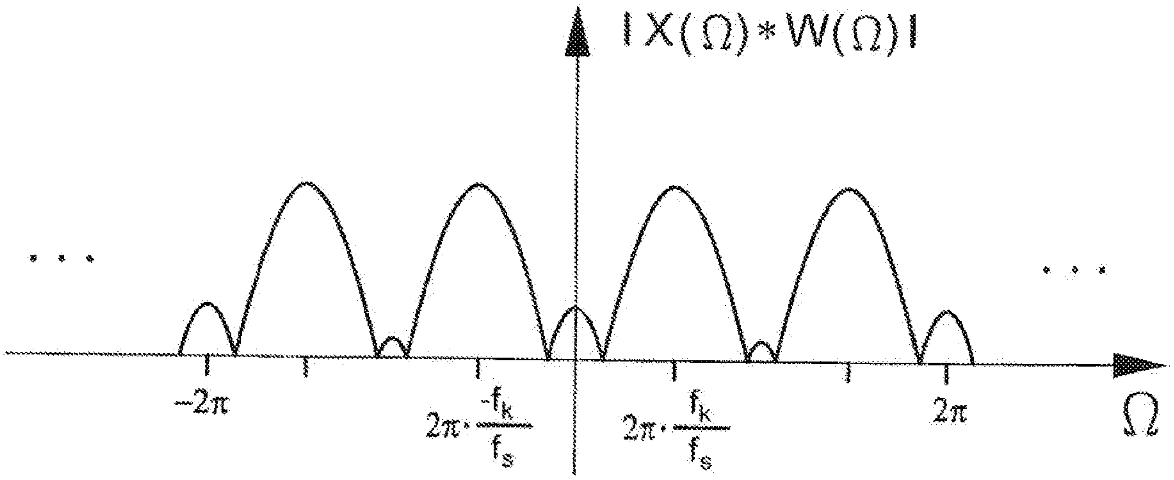
FIG. 5 shows a spectrum of a windowed sinusoidal signal with the frequency $f_k$.

For clarity it is noted that the convolution of the spectrum of the window function with the spectrum of the line spectrum of the sinusoidal model signal can be understood as a superposition of frequency-shifted versions of the window function spectrum, whereby the shift frequencies are the frequencies of the sinusoids. This superposition is then sampled at the DFT grid points. The convolution of the spectrum of the window function with the spectrum of the line spectrum of the sinusoidal model signal are illustrated in the FIGS. 3-FIG. 7, of which FIG. 3 displays an example of the magnitude spectrum of a window function, and FIG. 4 the magnitude spectrum (line spectrum) of an example sinusoidal signal with a single sinusoid with a frequency $f_k$. FIG. 5 shows the magnitude spectrum of the windowed sinusoidal signal that replicates and superposes the frequency-shifted window spectra at the frequencies of the sinusoid, and the bars in FIG. 6 correspond to the magnitude of the grid points of the DFT of the windowed sinusoid that are obtained by calculating the DFT of the analysis frame. Note that all spectra are periodic with the normalized frequency parameter Ω where Ω=2π that corresponds to the sampling frequency $f_s$.

Figure 6:
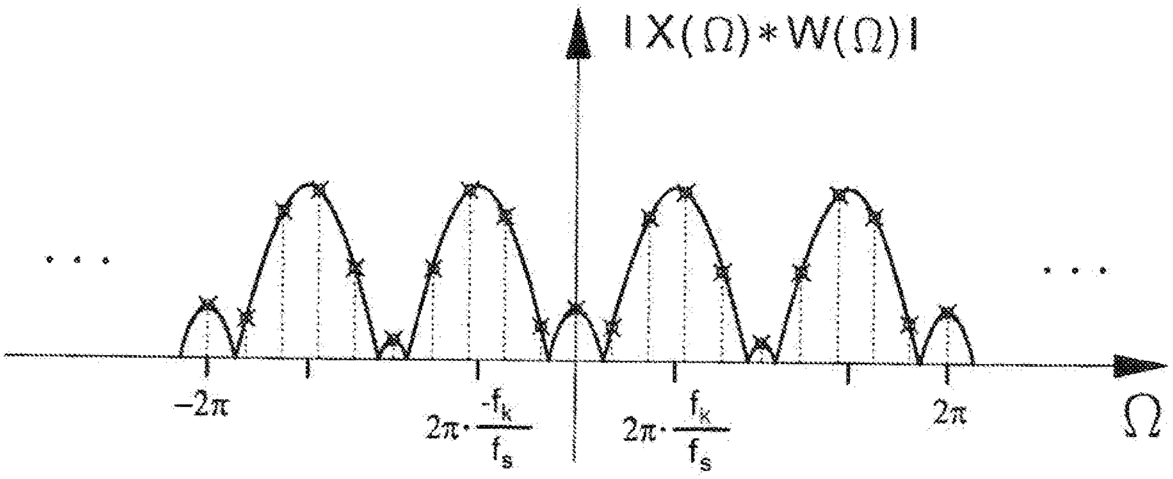
FIG. 6 illustrates bars corresponding to the magnitude of grid points of a DFT, based on an analysis frame.

Based on the above discussion, and based on the illustration in FIG. 6, a better approximation of the true sinusoidal frequencies may be found by increasing the resolution of the search, such that it is larger than the frequency resolution of the used frequency domain transform.

Thus, the identifying of frequencies of sinusoidal components is preferably performed with higher resolution than the frequency resolution of the used frequency domain transform, and the identifying may further involve interpolation.

One exemplary preferred way to find a better approximation of the frequencies $f_k$ of the sinusoids is to apply parabolic interpolation. One approach is to fit parabolas through the grid points of the DFT magnitude spectrum that surround the peaks and to calculate the respective frequencies belonging to the parabola maxima, and an exemplary suitable choice for the order of the parabolas is 2. In more detail, the following procedure may be applied:

1) Identifying the peaks of the DFT of the windowed analysis frame. The peak search will deliver the number of peaks K and the corresponding DFT indexes of the peaks. The peak search can typically be made on the DFT magnitude spectrum or the logarithmic DFT magnitude spectrum.

2) For each peak k (with k=1 . . . K) with corresponding DFT index $m_k$, fitting a parabola through the three points $\{P_1; P_2; P_3\}=\{(m_k-1, \log(|X(m_k-1)|); (m_k, \log(|X(m_k)|); (m_k+1, \log(|X(m_k+1)|)\}$. This results in parabola coefficients $b_k(0)$, $b_k(1)$, $b_k(2)$ of the parabola defined by $$p_k(q)=\sum_{i=0}^{2} b_k(i)\cdot q^i.$$

Figure 7:
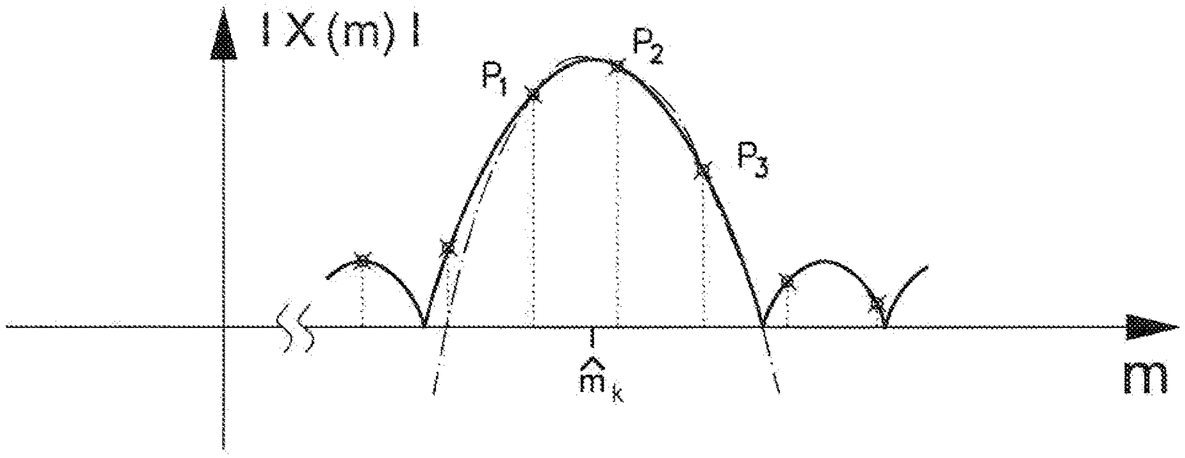
FIG. 7 illustrates a parabola fitting through DFT grid points.

FIG. 7 illustrates the parabola fitting through DFT grid points $P_1$, $P_2$ and $P_3$.

3) For each of the K parabolas, calculating the interpolated frequency index $\hat{m}_k$ corresponding to the value of q for which the parabola has its maximum, wherein $\hat{f}_k=\hat{m}_k\cdot f_s/L$ is used as an approximation for the sinusoid frequency $f_k$.

Applying a Sinusoidal Model

The application of a sinusoidal model in order to perform a frame loss concealment operation according to embodiments may be described as follows:

In case a given segment of the coded signal cannot be reconstructed by the decoder since the corresponding encoded information is not available, i.e. since a frame has been lost, an available part of the signal prior to this segment may be used as prototype frame. If y(n) with n=0 . . . N−1 is the unavailable segment for which a substitution frame z(n) has to be generated, and y(n) with n<0 is the available previously decoded signal, a prototype frame of the available signal of length L and start index is extracted with a window function w(n) and transformed into frequency domain, e.g. by means of DFT:

$$Y_{-1}(m)=\sum_{n=0}^{L-1} y(n-n_{-1})\cdot w(n)\cdot e^{-j\frac{2\pi}{L}nm}.$$

The window function can be one of the window functions described above in the sinusoidal analysis. Preferably, in order to save numerical complexity, the frequency domain transformed frame should be identical with the one used during sinusoidal analysis.

In a next step the sinusoidal model assumption is applied. According to the sinusoidal model assumption, the DFT of the prototype frame can be written as follows:

$$Y_{-1}(m)=\frac{1}{2}\sum_{k=1}^{K} a_k\cdot\left(\left(W\left(2\pi\left(\frac{m}{L}+\frac{f_k}{f_s}\right)\right)\cdot e^{-j\varphi_k}+W\left(2\pi\left(\frac{m}{L}-\frac{f_k}{f_s}\right)\right)\cdot e^{j\varphi_k}\right)\right).$$

This expression was also used in the analysis part and is described in detail above.

Figure 3:
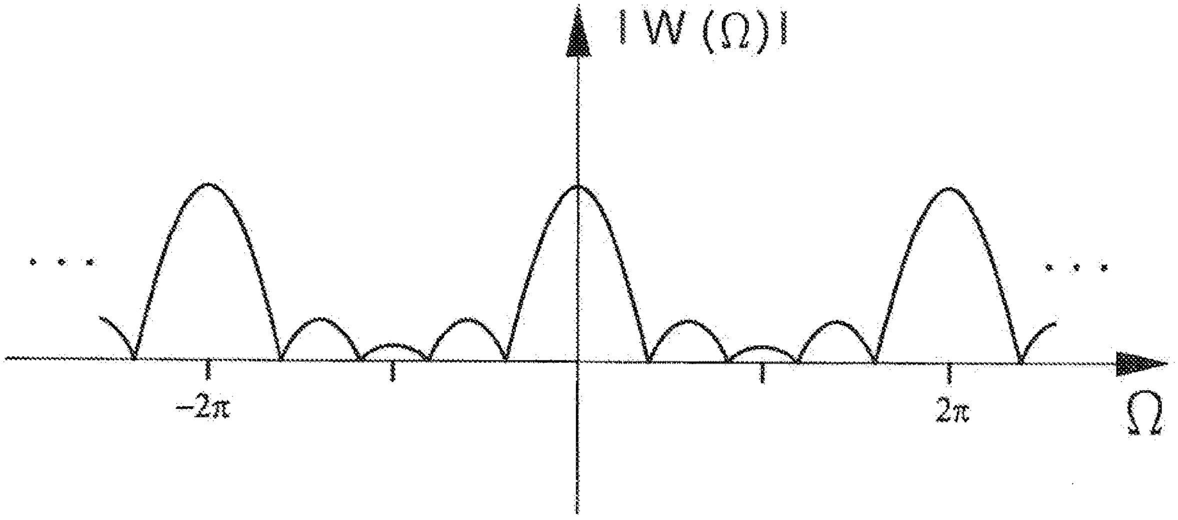
FIG. 3 displays an example of a magnitude spectrum of a window function.

Next, it is realized that the spectrum of the used window function has only a significant contribution in a frequency range close to zero. As illustrated in FIG. 3 the magnitude spectrum of the window function is large for frequencies close to zero and small otherwise (within the normalized frequency range from −π to π, corresponding to half the sampling frequency. Hence, as an approximation it is assumed that the window spectrum W(m) is non-zero only for an interval $M=[-m_{min}, m_{max}]$, with $m_{min}$ and $m_{max}$ being small positive numbers. In particular, an approximation of the window function spectrum is used such that for each k the contributions of the shifted window spectra in the above expression are strictly non-overlapping. Hence in the above equation for each frequency index there is always only at maximum the contribution from one summand, i.e. from one shifted window spectrum. This means that the expression above reduces to the following approximate expression:

$$\hat{Y}_{-1}(m)=\frac{a_k}{2}\cdot W\left(2\pi\left(\frac{m}{L}-\frac{f_k}{f_s}\right)\right)\cdot e^{j\varphi_k}$$

for non-negative $m\in M_k$ and for each k. Herein, $M_k$ denotes the integer interval $$M_k=\left[\mathrm{round}\left(\frac{f_k}{f_s}\cdot L\right)-m_{min,k},\ \mathrm{round}\left(\frac{f_k}{f_s}\cdot L\right)+m_{max,k}\right]],$$

where $m_{min,k}$ and $m_{max,k}$ fulfill the above explained constraint such that the intervals are not overlapping. A suitable choice form $m_{min,k}$ and $m_{max,k}$ is to set them to a small integer value, e.g. δ=3. If however the DFT indices related to two neighboring sinusoidal frequencies $f_k$ and $f_{k+1}$ are less than 2δ, then δ is set to $$\mathrm{floor}\left(\frac{\mathrm{round}\left(\frac{f_{k+1}}{f_s}\cdot L\right)-\mathrm{round}\left(\frac{f_k}{f_s}\cdot L\right)}{2}\right)$$

such that it is ensured that the intervals are not overlapping. The function floor(·) is the closest integer to the function argument that is smaller or equal to it.

The next step according to embodiments is to apply the sinusoidal model according to the above expression and to evolve its K sinusoids in time. The assumption that the time indices of the erased segment compared to the time indices of the prototype frame differs by $n_{-1}$ samples means that the phases of the sinusoids advance by $$\theta_k=2\pi\cdot\frac{f_k}{f_s}n_{-1}.$$

Hence, the DFT spectrum of the evolved sinusoidal model is given by:

$$Y_0(m) = \frac{1}{2}\sum_{k=1}^{K} a_k \cdot \left(\left(W\left(2\pi\left(\frac{m}{L} + \frac{f_k}{f_s}\right)\right) \cdot e^{-j(\varphi_k+\theta_k)} + W\left(2\pi\left(\frac{m}{L} - \frac{f_k}{f_s}\right)\right) \cdot e^{j(\varphi_k+\theta_k)}\right)\right).$$

Applying again the approximation according to which the shifted window function spectra do no overlap gives:

$$\hat{Y}_0(m) = \frac{a_k}{2} \cdot W\left(2\pi\left(\frac{m}{L} - \frac{f_k}{f_s}\right)\right) \cdot e^{j(\varphi_k+\theta_k)}$$

for non-negative $m \in M_k$ and for each k.

Comparing the DFT of the prototype frame $Y_{-1}(m)$ with the DFT of evolved sinusoidal model $Y_0(m)$ by using the approximation, it is found that the magnitude spectrum remains unchanged while the phase is shifted by $$\theta_k = 2\pi \cdot \frac{f_k}{f_s} n_{-1},$$

for each $m \in M_k$. Hence, the substitution frame can be calculated by the following expression: $z(n)=\text{IDFT}\{Z(m)\}$ with $Z(m)=Y(m)\cdot e^{j\theta_k}$ for non-negative $m \in M_k$ and for each k.

A specific embodiment addresses phase randomization for DFT indices not belonging to any interval $M_k$. As described above, the intervals $M_k$, k=1 . . . K have to be set such that they are strictly non-overlapping which is done using some parameter δ which controls the size of the intervals. It may happen that δ is small in relation to the frequency distance of two neighboring sinusoids. Hence, in that case it happens that there is a gap between two intervals. Consequently, for the corresponding DFT indices m no phase shift according to the above expression $Z(m)=Y(m)\cdot e^{j\theta_k}$ is defined. A suitable choice according to this embodiment is to randomize the phase for these indices, yielding $Z(m)=Y(m)\cdot e^{j2\pi rand(\cdot)}$, where the function rand(·) returns some random number.

Figure 8:
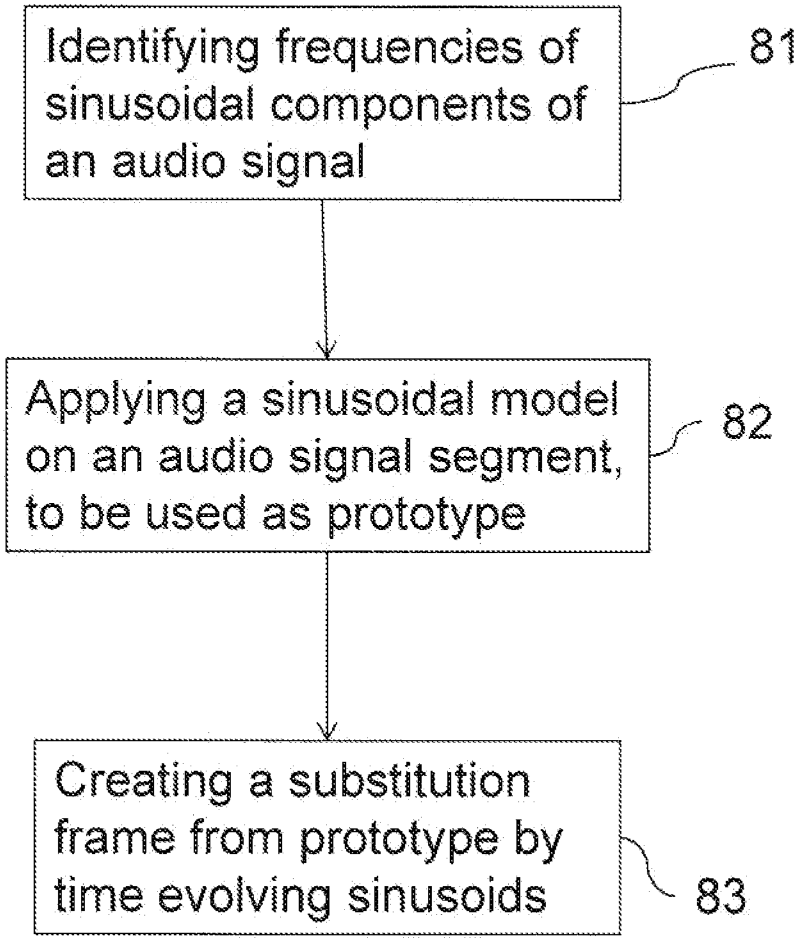
FIG. 8 is a flow chart of a method according to embodiments.

Based on the above, FIG. 8 is a flow chart illustrating an exemplary audio frame loss concealment method according to embodiments:

In step 81, a sinusoidal analysis of a part of a previously received or reconstructed audio signal is performed, wherein the sinusoidal analysis involves identifying frequencies of sinusoidal components, i.e. sinusoids, of the audio signal. Next, in step 82, a sinusoidal model is applied on a segment of the previously received or reconstructed audio signal, wherein said segment is used as a prototype frame in order to create a substitution frame for a lost audio frame, and in step 83 the substitution frame for the lost audio frame is created, involving time-evolution of sinusoidal components, i.e. sinusoids, of the prototype frame, up to the time instance of the lost audio frame, in response to the corresponding identified frequencies.

According to a further embodiment, it is assumed that the audio signal is composed of a limited number of individual sinusoidal components, and that the sinusoidal analysis is performed in the frequency domain. Further, the identifying of frequencies of sinusoidal components may involve identifying frequencies in the vicinity of the peaks of a spectrum related to the used frequency domain transform.

According to an exemplary embodiment, the identifying of frequencies of sinusoidal components is performed with higher resolution than the resolution of the used frequency domain transform, and the identifying may further involve interpolation, e.g. of parabolic type.

According to an exemplary embodiment, the method comprises extracting a prototype frame from an available previously received or reconstructed signal using a window function, and wherein the extracted prototype frame may be transformed into a frequency domain.

A further embodiment involves an approximation of a spectrum of the window function, such that the spectrum of the substitution frame is composed of strictly non-overlapping portions of the approximated window function spectrum.

According to a further exemplary embodiment, the method comprises time-evolving sinusoidal components of a frequency spectrum of a prototype frame by advancing the phase of the sinusoidal components, in response to the frequency of each sinusoidal component and in response to the time difference between the lost audio frame and the prototype frame, and changing a spectral coefficient of the prototype frame included in an interval $M_k$ in the vicinity of a sinusoid k by a phase shift proportional to the sinusoidal frequency $f_k$ and to the time difference between the lost audio frame and the prototype frame.

A further embodiment comprises changing the phase of a spectral coefficient of the prototype frame not belonging to an identified sinusoid by a random phase, or changing the phase of a spectral coefficient of the prototype frame not included in any of the intervals related to the vicinity of the identified sinusoid by a random value.

An embodiment further involves an inverse frequency domain transform of the frequency spectrum of the prototype frame.

More specifically, the audio frame loss concealment method according to a further embodiment may involve the following steps:

1) Analyzing a segment of the available, previously synthesized signal to obtain the constituent sinusoidal frequencies $f_k$ of a sinusoidal model.
2) Extracting a prototype frame $y_{-1}$ from the available previously synthesized signal and calculate the DFT of that frame.
3) Calculating the phase shift $\theta_k$ for each sinusoid k in response to the sinusoidal frequency $f_k$ and the time advance $n_{-1}$ between the prototype frame and the substitution frame.
4) For each sinusoid k advancing the phase of the prototype frame DFT with $\theta_k$ selectively for the DFT indices related to a vicinity around the sinusoid frequency $f_k$.
5) Calculating the inverse DFT of the spectrum obtained 4).

The embodiments describe above may be further explained by the following assumptions:

a) The assumption that the signal can be represented by a limited number of sinusoids.
b) The assumption that the substitution frame is sufficiently well represented by these sinusoids evolved in time, in comparison to some earlier time instant.
c) The assumption of an approximation of the spectrum of a window function such that the spectrum of the substitution frame can be built up by non-overlapping portions of frequency shifted window function spectra, the shift frequencies being the sinusoid frequencies.

Figure 9:
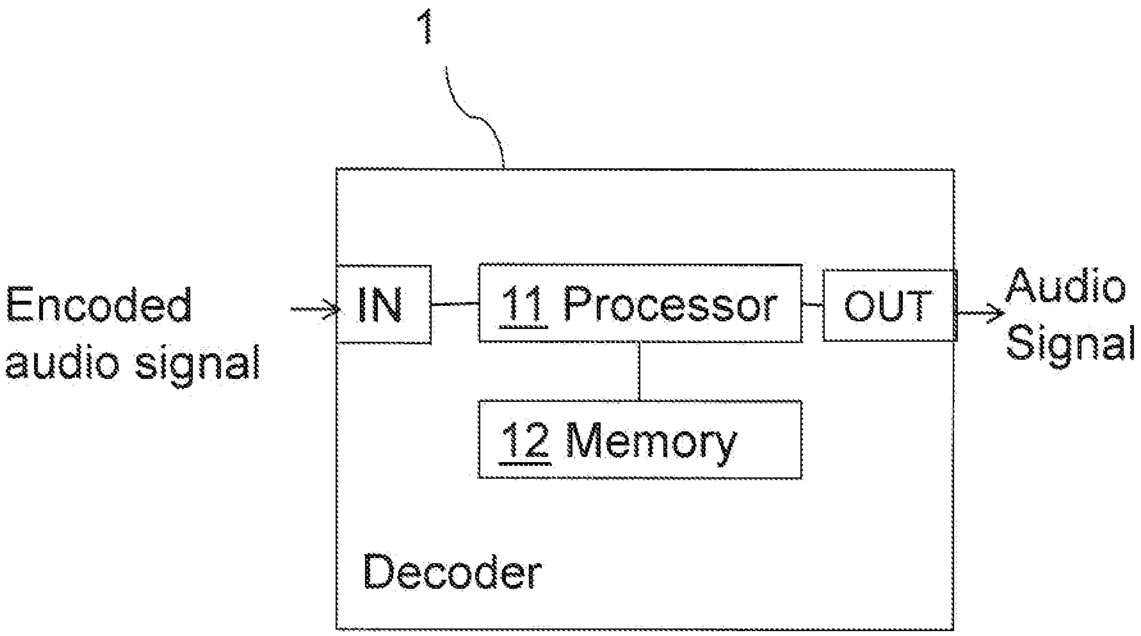
FIGS. 9, 10*a*, and 10*b* illustrate a decoder(s) according to embodiments.

FIG. 9 is a schematic block diagram illustrating an exemplary decoder 1 configured to perform a method of audio frame loss concealment according to embodiments. The illustrated decoder comprises one or more processor 11 and adequate software with suitable storage or memory 12. The incoming encoded audio signal is received by an input (IN), to which the processor 11 and the memory 12 are connected. The decoded and reconstructed audio signal obtained from the software is outputted from the output (OUT). An exemplary decoder is configured to conceal a lost audio frame of a received audio signal, and comprises a processor 11 and memory 12, wherein the memory contains instructions executable by the processor 11, and whereby the decoder 1 is configured to:

- perform a sinusoidal analysis of a part of a previously received or reconstructed audio signal, wherein the sinusoidal analysis involves identifying frequencies of sinusoidal components of the audio signal;
- apply a sinusoidal model on a segment of the previously received or reconstructed audio signal, wherein said segment is used as a prototype frame in order to create a substitution frame for a lost audio frame, and
- create the substitution frame for the lost audio frame by time-evolving sinusoidal components of the prototype frame, up to the time instance of the lost audio frame, in response to the corresponding identified frequencies.

According to a further embodiment of the decoder, the applied sinusoidal model assumes that the audio signal is composed of a limited number of individual sinusoidal components, and the identifying of frequencies of sinusoidal components of the audio signal may further comprise a parabolic interpolation.

According to a further embodiment, the decoder is configured to extract a prototype frame from an available previously received or reconstructed signal using a window function, and to transform the extracted prototype frame into a frequency domain.

According to a still further embodiment, the decoder is configured to time-evolve sinusoidal components of a frequency spectrum of a prototype frame by advancing the phase of the sinusoidal components, in response to the frequency of each sinusoidal component and in response to the time difference between the lost audio frame and the prototype frame, and to create the substitution frame by performing an inverse frequency transform of the frequency spectrum.

Figure 10A:
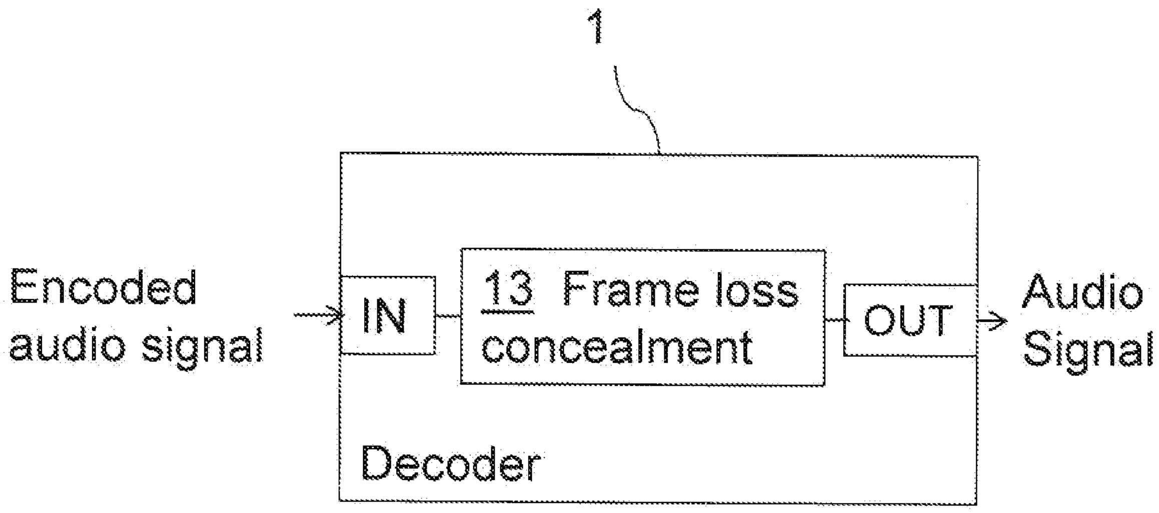
Figure 10B:
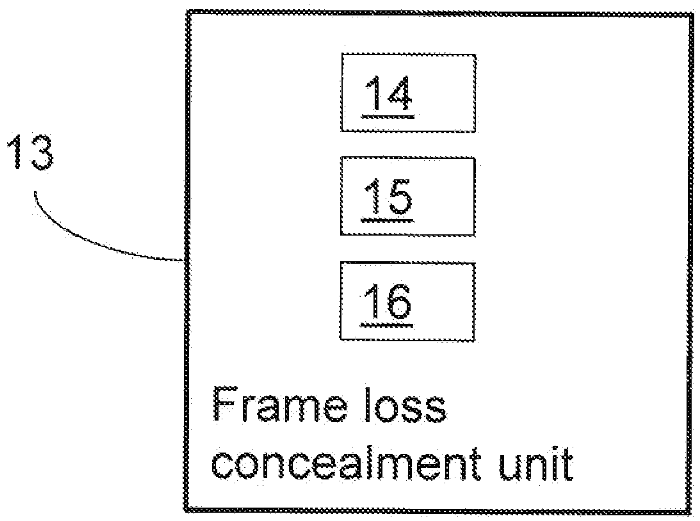

A decoder according to an alternative embodiment is illustrated in FIG. 10*a*, comprising an input unit configured to receive an encoded audio signal. The figure illustrates the frame loss concealment by a logical frame loss concealment-unit 13, wherein the decoder 1 is configured to implement a concealment of a lost audio frame according to embodiments described above. The logical frame loss concealment unit 13 is further illustrated in FIG. 10*b*, and it comprises suitable means for concealing a lost audio frame, i.e. means 14 for performing a sinusoidal analysis of a part of a previously received or reconstructed audio signal, wherein the sinusoidal analysis involves identifying frequencies of sinusoidal components of the audio signal, means 15 for applying a sinusoidal model on a segment of the previously received or reconstructed audio signal, wherein said segment is used as a prototype frame in order to create a substitution frame for a lost audio frame, and means 16 for creating the substitution frame for the lost audio frame by time-evolving sinusoidal components of the prototype frame, up to the time instance of the lost audio frame, in response to the corresponding identified frequencies.

The units and means included in the decoder illustrated in the figures may be implemented at least partly in hardware, and there are numerous variants of circuitry elements that can be used and combined to achieve the functions of the units of the decoder. Such variants are encompassed by the embodiments. A particular example of hardware implementation of the decoder is implementation in digital signal processor (DSP) hardware and integrated circuit technology, including both general-purpose electronic circuitry and application-specific circuitry.

Figure 11:
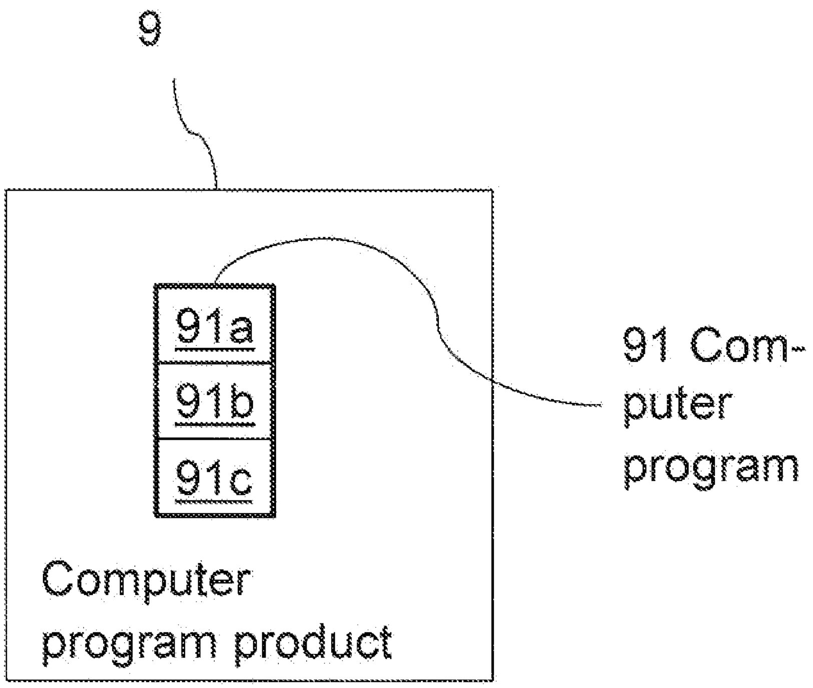
FIG. 11 illustrates a computer program and a computer program product, according to embodiments.

A computer program according to embodiments of the present invention comprises instructions which when run by a processor causes the processor to perform a method according to a method described in connection with FIG. 8. FIG. 11 illustrates a computer program product 9 according to embodiments, in the form of a non-volatile memory, e.g. an EEPROM (Electrically Erasable Programmable Read-Only Memory), a flash memory or a disk drive. The computer program product comprises a computer readable medium storing a computer program 91, which comprises computer program modules 91*a,b,c,d* which when run on a decoder 1 causes a processor of the decoder to perform the steps according to FIG. 8.

A decoder according to embodiments of this invention may be used e.g. in a receiver for a mobile device, e.g. a mobile phone or a laptop, or in a receiver for a stationary device, e.g. a personal computer.

Advantages of the embodiments described herein are to provide a frame loss concealment method allowing mitigating the audible impact of frame loss in the transmission of audio signals, e.g. of coded speech. A general advantage is to provide a smooth and faithful evolution of the reconstructed signal for a lost frame, wherein the audible impact of frame losses is greatly reduced in comparison to conventional techniques.

It is to be understood that the choice of interacting units or modules, as well as the naming of the units are only for exemplary purpose, and may be configured in a plurality of alternative ways in order to be able to execute the disclosed process actions. It should also be noted that the units or modules described in this disclosure are to be regarded as logical entities and not with necessity as separate physical entities. It will be appreciated that the scope of the technology disclosed herein fully encompasses other embodiments which may become obvious to those skilled in the art, and that the scope of this disclosure is accordingly not to be limited.

The invention claimed is:

1. A frame loss concealment method, wherein a segment from a previously received or reconstructed audio signal is used as a prototype frame in creating a substitution frame for a lost audio frame, the method comprising:

- obtaining the prototype frame;
- transforming the prototype frame into a frequency domain at a first frequency resolution;
- applying a sinusoidal model to the prototype frame in the frequency domain to identify a frequency of at least one sinusoidal component of the prototype frame at a second frequency resolution higher than the first frequency resolution;
- determining a phase shift $\theta_k$ for the at least one sinusoidal component;
- shifting a phase of all spectral coefficients in the prototype frame included in an interval $M_k$ around a sinusoid k by the phase shift $\theta_k$ while retaining a magnitude of the spectral coefficients in the prototype frame included in the interval $M_k$ around the sinusoid k, wherein phases of spectral coefficients that are not phase shifted are randomized;

creating the substitution frame by performing an inverse frequency transform of a frequency spectrum of the prototype frame after phase shifting the spectral coefficients in the prototype frame included in the interval $M_k$ around the sinusoid k and randomizing the phases of spectral coefficients that are not phase shifted; and using the substitution frame in place of the lost audio frame for playback of the audio signal.

2. The frame loss concealment method according to claim 1, wherein the phase shift $\theta_k$ depends on a sinusoidal frequency $f_k$ and a time shift between the prototype frame and the lost audio frame.

3. The frame loss concealment method according to claim 1, wherein at least one of transforming, applying, calculating, phase shifting, and/or creating is performed by a processor, the method further comprising:

providing by the processor an audio signal for speaker playback, wherein the audio signal is provided using the substitution frame.

4. The frame loss concealment method according to claim 1 further comprising:

using the substitution frame in place of the lost audio frame to reduce audible impact of the lost audio frame.

5. The frame loss concealment method according to claim 1 further comprising:

providing a decoded and reconstructed audio signal for speaker playback, wherein the decoded and reconstructed audio signal is provided using the substitution frame and the previously received or reconstructed audio signal; and transmitting the decoded and reconstructed audio signal through output circuitry towards a speaker for the speaker playback.

6. The frame loss concealment method according to claim 1 wherein the spectral coefficients that are not phase shifted include spectral coefficients in a gap between two $M_k$ intervals, wherein intervals k=1 . . . K of Mk are strictly non-overlapping.

7. The frame loss concealment method according to claim 1 wherein obtaining the prototype frame comprises receiving the segment from the previously received or reconstructed audio signal through an input circuit, the method further comprising outputting the substitution frame through an output circuit toward an electronic device have a loudspeaker for playback through the loudspeaker.

8. The frame loss concealment method according to claim 1 further comprising:

replacing the lost audio frame with the substitution frame in the previously received or reconstructed audio signal; and outputting the substitution frame and the previously received or reconstructed audio signal towards storage.

9. The frame loss concealment method according to claim 1, wherein identifying of the frequency of the at least one sinusoidal component further involves identifying frequencies in a vicinity of peaks of a spectrum related to a frequency domain transform used to transform the prototype frame.

10. The frame loss concealment method according to claim 1 wherein applying the sinusoidal model to the prototype frame in the frequency domain to identify a frequency of at least one sinusoidal component of the previously received or reconstructed audio signal comprises applying the sinusoidal model to the prototype frame in the frequency domain to identify a frequency of at least one sinusoidal component of the previously received or reconstructed audio signal via parabolic interpolation.

11. An apparatus for creating a substitution frame for a lost audio frame, the apparatus comprising:

a processor; and memory communicatively coupled to the processor, said memory comprising instructions executable by the processor, which cause the processor to:

generate a prototype frame from a segment of a previously received or reconstructed audio signal;

transform the prototype frame into a frequency domain at a first frequency resolution;

apply a sinusoidal model to the prototype frame in the frequency domain to identify a frequency of at least one sinusoidal component of the previously received or reconstructed audio signal at a second frequency resolution higher than the first frequency resolution;

determine a phase shift $\theta_k$ for the at least one sinusoidal component;

shift a phase of all spectral coefficients in the prototype frame included in an interval $M_k$ around a sinusoid k by the phase shift $\theta_k$ while retaining a magnitude of the spectral coefficients in the prototype frame included in the interval $M_k$ around the sinusoid k, wherein phases of spectral coefficients that are not phase shifted are randomized and the spectral coefficients that are not phase shifted include spectral coefficients in a gap between two $M_k$ intervals, wherein intervals k=1 . . . K of $M_k$ are non-overlapping;

create the substitution frame by performing an inverse frequency transform of a frequency spectrum of the prototype frame after phase shifting the spectral coefficients in the prototype frame included in the interval $M_k$ around the sinusoid k and randomizing the phases of spectral coefficients that are not phase shifted; and use the substitution frame in place of the lost audio frame.

12. The apparatus according to claim 11, wherein the phase shift $\theta_k$ depends on a sinusoidal frequency $f_k$ and a time shift between the prototype frame and the lost audio frame.

13. The apparatus according to claim 11, further comprising:

a loudspeaker, wherein the instructions comprise further instructions to play the substitution frame that is created through the loudspeaker.

14. The apparatus according to claim 11, further comprising:

an input circuit; and an output circuit, wherein the processor is operated to receive the segment from the previously received or reconstructed audio signal through the input circuit, and to output the substitution frame through the output circuit toward a device having a loudspeaker for playback through the loudspeaker.

15. The apparatus according to claim 11 wherein to apply the sinusoidal model to the prototype frame in the frequency domain to identify a frequency of at least one sinusoidal component of the previously received or reconstructed audio signal, the memory comprises instructions executable by the processor, which cause the processor to apply the sinusoidal model to the prototype frame in the frequency domain to identify a frequency of at least one sinusoidal component of the previously received or reconstructed audio signal via parabolic interpolation.

16. The apparatus according to claim 11, wherein the spectral coefficients that are not phase shifted include spectral coefficients in a gap between two $M_k$ intervals, wherein intervals k=1 . . . K of $M_k$ are strictly non-overlapping.

17. A computer program product comprising a non-transitory computer readable storage medium storing instructions which, when run by a processor, causes the processor to perform operations comprising:

obtaining a segment from a previously received or reconstructed audio signal to use as a prototype frame in creating a substitution frame for a lost audio frame;

transforming the prototype frame into a frequency domain at a first frequency resolution;

applying a sinusoidal model to the prototype frame in the frequency domain to identify a frequency of at least one sinusoidal component of the prototype frame at a second frequency resolution higher than the first frequency resolution;

determining a phase shift $\theta_k$ for the at least one sinusoidal component;

shifting a phase of all spectral coefficients in the prototype frame included in an interval $M_k$ around a sinusoid k by the phase shift $\theta_k$ while retaining a magnitude of the spectral coefficients in the prototype frame included in the interval $M_k$ around the sinusoid k, wherein phases of spectral coefficients that are not phase shifted are randomized and the spectral coefficients that are not phase shifted include spectral coefficients in a gap between two $M_k$ intervals;

creating the substitution frame by performing an inverse frequency transform of a frequency spectrum of the prototype frame after phase shifting the spectral coefficients in the prototype frame included in the interval $M_k$ around the sinusoid k and randomizing the phases of spectral coefficients that are not phase shifted; and using the substitution frame in place of the lost audio frame.

18. The computer program product according to claim 15, wherein the phase shift $\theta_k$ depends on a sinusoidal frequency $f_k$ and a time shift between the prototype frame and the lost audio frame.

19. The computer program product according to claim 15, wherein to identify the frequency of the at least one sinusoidal component, the processor identifies frequencies in a vicinity of peaks of a spectrum related to a frequency domain transform used to transform the prototype frame.

20. The computer program product according to claim 15 wherein to apply the sinusoidal model to the prototype frame in the frequency domain to identify a frequency of at least one sinusoidal component of the previously received or reconstructed audio signal, the processor applies the sinusoidal model to the prototype frame in the frequency domain to identify a frequency of at least one sinusoidal component of the previously received or reconstructed audio signal via parabolic interpolation.

* * * * *